US008447136B2

(12) United States Patent
Ofek et al.

(10) Patent No.: US 8,447,136 B2
(45) Date of Patent: May 21, 2013

(54) VIEWING MEDIA IN THE CONTEXT OF STREET-LEVEL IMAGES

(75) Inventors: Eyal Ofek, Redmond, WA (US); Michael Kroepfl, Bellevue, WA (US); Julian R. Walker, Seattle, WA (US); Gonzalo A. Ramos, Bellevue, WA (US); Blaise Hilary Aguera y Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 12/717,846

(22) Filed: Mar. 4, 2010

(65) Prior Publication Data

US 2011/0173565 A1    Jul. 14, 2011

Related U.S. Application Data

(60) Provisional application No. 61/294,435, filed on Jan. 12, 2010.

(51) Int. Cl.
*G06K 9/36* (2006.01)
*G06K 9/00* (2006.01)
*G06K 9/32* (2006.01)
*G06F 3/048* (2006.01)

(52) U.S. Cl.
USPC ........... 382/284; 382/113; 382/294; 382/295; 382/296; 382/276; 715/790; 715/781

(58) Field of Classification Search
USPC .................................. 382/113; 715/790, 781
See application file for complete search history.

(56) References Cited

U.S. PATENT DOCUMENTS

| 6,337,683 | B1 * | 1/2002 | Gilbert et al. ................. 345/418 |
| 7,088,850 | B2 * | 8/2006 | Wei et al. ...................... 382/128 |
| 7,359,797 | B2 |  4/2008 | Dorfman |
| 7,620,909 | B2 * | 11/2009 | Park et al. ...................... 715/790 |
| 7,697,027 | B2 * |  4/2010 | McMahon et al. ............ 348/148 |
| 8,085,990 | B2 * | 12/2011 | Ofek .............................. 382/113 |
| 8,355,046 | B2 * |  1/2013 | Fujii ............................. 348/159 |
| 2007/0076920 | A1 * |  4/2007 | Ofek .............................. 382/113 |
| 2007/0226614 | A1 |  9/2007 | Lorenzen |
| 2008/0043020 | A1 |  2/2008 | Snow |
| 2008/0187181 | A1 * |  8/2008 | Meadow et al. .............. 382/113 |
| 2008/0292213 | A1 | 11/2008 | Chau |
| 2009/0147003 | A1 * |  6/2009 | Do et al. ........................ 345/427 |
| 2009/0213112 | A1 * |  8/2009 | Zhu et al. ....................... 345/419 |
| 2010/0302280 | A1 * | 12/2010 | Szeliski et al. ................ 345/660 |
| 2010/0305844 | A1 * | 12/2010 | Choi et al. ..................... 701/201 |
| 2011/0007134 | A1 * |  1/2011 | Knize et al. ..................... 348/43 |
| 2011/0090337 | A1 * |  4/2011 | Klomp et al. .................. 348/144 |
| 2011/0211040 | A1 * |  9/2011 | Lindemann et al. ............ 348/36 |

OTHER PUBLICATIONS

Mobile Mixed Reality, http://research.nokia.com/files/insight/NTI_MARA_-_June_2009.pdf, published Jun. 2009.

(Continued)

*Primary Examiner* — Michelle Entezari
(74) *Attorney, Agent, or Firm* — Microsoft Corporation

(57) ABSTRACT

A system for displaying hybrid image data produced by embedding additional media objects within street-level panoramic images includes a user interface through which a user may view, search for, and/or navigate through additional media objects in the context of browsing a virtual environment of a location at street level. In response to user input indicating a request to view a geographic location and/or an additional media object, street-level panoramic image data associated with the geographic location, in which one or more additional media objects also associated with the geographic location have been embedded, may be provided for display through the user interface. The user interface may be provided by a client device including one or more processors that receive hybrid image data produced by one or more processors of a server and display the image data to the user.

20 Claims, 14 Drawing Sheets

OTHER PUBLICATIONS

Finding Images on Flikr—http://jiscdigitalmedia.ac.uk/stillimages/advice/finding-images-on-flikr/, published Jul. 13, 2009.
Amazon Launches Mapping Site, http://mediapost.com/publications/?fa=Articles.showArticle&art_aid=33239, published Aug. 17, 2005.
Canpages Continues to Build Its 'Street View' http://gesterling.wordpress.com/2009/08/27/canpages-continues-to-build-its-street-view/, retrieved Jan. 5, 2010.
Office Action issued in Chinese Patent Application No. 201110022517.7 by Chinese Patent Office on Jan. 5, 2013, 10 pages.

* cited by examiner

VIEWING MEDIA IN THE CONTEXT OF STREET-LEVEL IMAGES

RELATED APPLICATION

This application claims priority under 35 U.S.C. §119(e) to U.S. Provisional Application No. 61/294,435, filed Jan. 12, 2010, entitled Viewing Media in the Context of Street-Level Images, incorporated herein in its entirety by reference.

BACKGROUND

Mapping applications are widely available as software over the Internet; examples of such mapping applications are BING Maps and GOOGLE® Maps. These applications provide road maps of locations specified by a user, and can also provide driving directions to a location or information about a location or its surroundings. For example, mapping applications may identify to a user restaurants or other points of interest in the vicinity of a specified location.

Some current mapping applications offer an option commonly referred to as "street view", in which a user of the application can view a geographic location from a first-person street-level perspective. In response to a user requesting a street view for a particular geographic location, for example by entering a particular street address into the mapping application and clicking a button labeled "street view", such mapping applications provide a view as if the user were standing or driving on the street at that location. This street-level view is commonly provided in a viewport that displays a portion of a 360-degree panoramic image. The user can typically change perspective within the panorama by virtually rotating the image, updating the viewport with different portions of the panoramic image to view the first-person scene at that location from different angles of rotation.

Some mapping applications also present additional media such as user content in association with particular geographic locations. User content is commonly obtained through the Internet from online sources, such as photo sharing websites. For example, user content may be digital photographs taken by users from various walks of life and uploaded to a photo sharing website. Examples of known photo sharing websites are the FLICKR® website and the PANORAMIO® website. Often, a digital photograph is geotagged, i.e., encoded with metadata indicating the geographic location at which the photograph was taken. A photograph can be geotagged at the time it is taken using a global positioning system (GPS)-enabled camera, or the photograph can be geotagged later through the photo sharing website. Geotagged user content can be accessed through the Internet to be displayed in mapping applications.

When a user selects a geographic location to browse in a mapping application, a list of user content (e.g., user photographs) geotagged with nearby locations can be presented. A user can choose to view a particular user photograph, for example, by clicking on the photograph's link or thumbnail in the list. The selected photograph is then presented to the user as a separate viewing screen.

SUMMARY

The inventors have recognized and appreciated that desirable user experiences may be provided by embedding additional media objects within street-level panoramic images. The additional media objects may thus be viewed with the surrounding context in which they were captured. These additional media objects may be photographs, videos or visual representations of features that may appear in a street-level panoramic image.

As a result, the user experience of browsing a location in a street view mode of a mapping application may be enhanced by displaying for the user additional media objects in the context of the street view, even as the user changes the perspective of the street view using navigation controls within the mapping application. The user experience of viewing individual media objects also may be enhanced by embedding them within the context of the panoramic street-level scene of the location at which they were captured. The user thus may be provided with an immersive three-dimensional experience in which the media objects may be viewed as if the user were standing near where the media object was captured, with a full panoramic first-person range of view of the location.

Some embodiments according to the present disclosure provide a system including a user interface through which a user may view, search for, and/or navigate through additional media objects in the context of browsing a virtual environment of a location in street view mode. In response to user input indicating a request to view a geographic location and/or an additional media object, street-level panoramic image data associated with the geographic location, in which one or more additional media objects also associated with the geographic location have been embedded, may be provided for display through the user interface. The user interface may be provided by a client device that receives hybrid image data from a server and displays the image data to the user. The server may be operatively connected to a dataset storing geographical associations between street-level panoramic images and additional media objects, and may produce the hybrid image data by embedding additional media objects within street-level panoramic images with which they are geographically associated. The server may provide the hybrid image data, through a network, to the client device for display to the user, in response to user input to view the hybrid image data or other inputs that identify a hybrid image and a view direction or that identify changes relative to a previously selected hybrid image or view direction.

User input to view hybrid image data may be received in any of various forms, and some or all of the parameters used to select a hybrid image for presentation may be expressly entered, while others may be implied from other user selections. In some embodiments, user input may be an indication of a particular geographic location that the user would like to view at street level. In response to such user input, a street-level panoramic image corresponding to that location may be selected, along with one or more additional media objects associated with that panoramic image in the associations dataset. A portion of the panoramic image, with one or more of the additional media objects embedded within it, may be rendered in a viewport of the user interface. Such a display may be achieved using a hybrid panoramic image produced by embedding one or more additional media objects within the street-level panoramic image, and providing hybrid image data representing a portion of the hybrid panoramic image for display in the viewport. The portion of the hybrid panoramic image to be displayed in the viewport may be selected in accordance with a view direction, which may have a default value or may be determined in accordance with user input. The view direction may be changed through user input to rotate the panorama, in response to which new hybrid image data may be produced and provided for display.

In response to user input to view a particular geographic location, one or more associated additional media objects embedded in the panorama may be automatically displayed.

Alternatively or additionally, the user interface may provide a list and/or other indication Of available additional media objects associated with a geographic location indicated by user input. The list and/or other indication of additional media objects may be provided in a panel separate from the viewport in the user interface, and/or may be provided through visual indicators on the street-level view within the viewport. Visual indicators on the street-level view may be of various forms, such as labels, push pins, footprint frames, and scrub bars. The user may select an additional media object to view, e.g., by clicking on a visual or textual indicator of the available additional media object. In response to this user input, new hybrid image data may be displayed in the viewport, representing a portion of the hybrid panoramic image corresponding to a view direction that allows the embedded additional media object to be viewed.

In other embodiments, user input to view hybrid image data may be an indication of a particular additional media object that the user would like to view. For example, the user interface may provide a search field through which a user may search for additional media objects by one or more parameters, such as an author of media objects, a subject of media objects, a time at which media objects were captured, or a location at which media objects were captured. Additional media objects may be stored in an additional media dataset in conjunction with metadata allowing them to be categorized according to such parameters. In response to the user's search query, a list of appropriate additional media objects may be displayed through the user interface. In response to the user's selection of a particular additional media object from the list, the server may identify a corresponding geographic location, street-level panoramic image and view direction, produce corresponding hybrid image data, and provide the hybrid image data for display through the viewport of the user interface.

Some embodiments further provide systems and methods for producing hybrid image data, in response to user input of any of various forms as described above. The user input may include an indication of a geographic location, an associated additional media object, or both. If either is not directly indicated by the user input, it may be determined based on the other. A view direction may also be determined, based on the geographic location, the additional media object, and/or independent user input. From the geographic location, a corresponding street-level panoramic image may be selected. The additional media object may be retrieved from the additional media dataset, and a pre-computed transform that best maps features of the additional media object to features of the panoramic image may be retrieved from projection data in the associations dataset. The additional media object may then be projected onto the panoramic image using the pre-computed transform to produce a hybrid panoramic image with the embedded additional media object. In accordance with the view direction, hybrid image data representing a portion of the hybrid panoramic image may be provided for display in the viewport of the user interface.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A system that provides an enhanced user experience by integrating street-level views with additional media objects and presenting both with a synchronized point of view, even as user inputs or other events change the street-level view or the media objects, may be initially constructed using techniques as are known in the art for constructing mapping applications. These techniques may be extended through the incorporation of processing and interfaces as described below.

Figure 1:
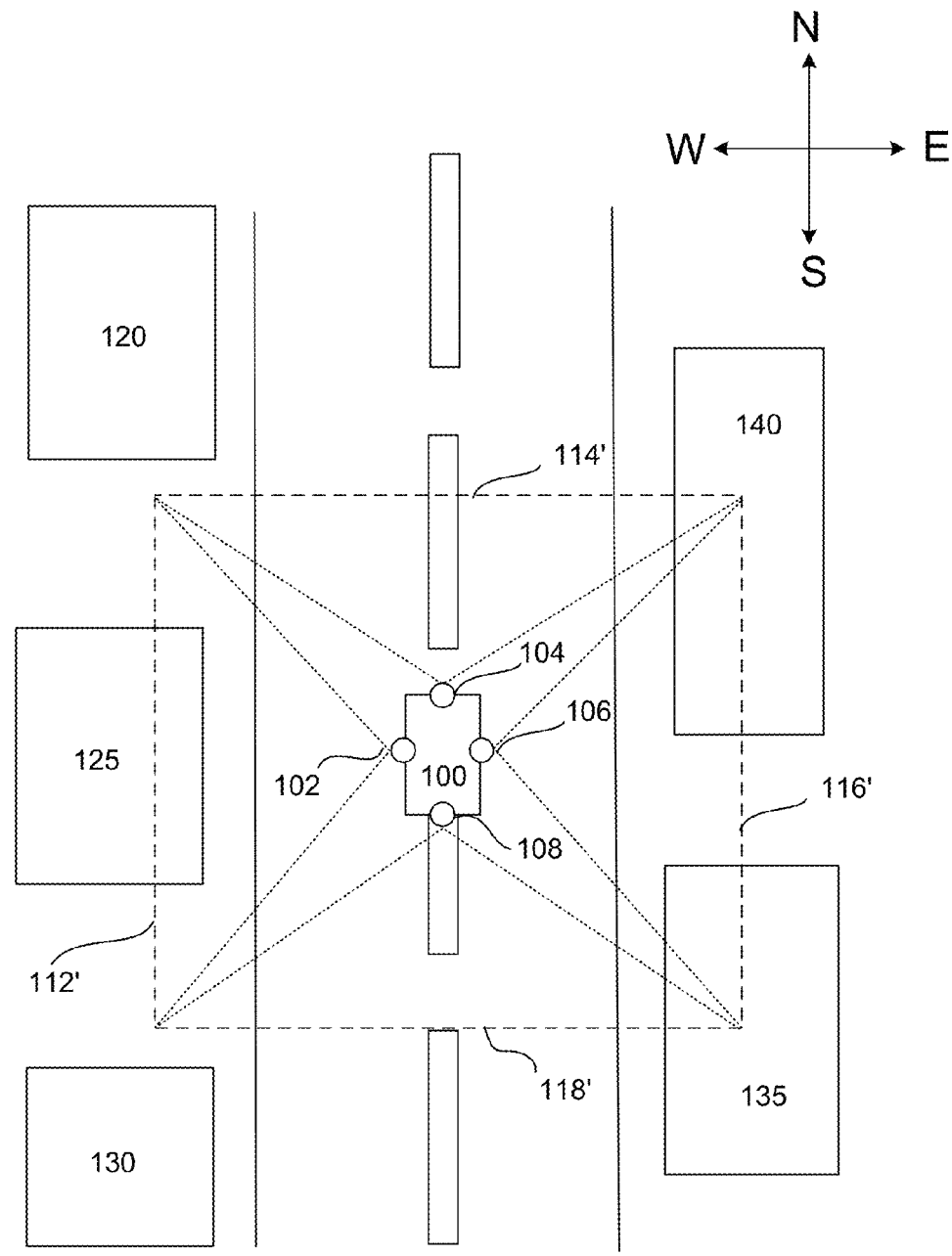
FIG. 1 illustrates a conventional set-up for capturing a street-level panoramic image.

The system may select street-level images from a plurality of street-level panoramic images for geographic locations that can be captured using known techniques and stored in a format such that they can be virtually explored by a user in a mapping application. For example, it is known for mapping application developers to drive specially equipped vehicles through the streets of cities or other areas supported by the mapping application, recording street-level panoramic images at predefined intervals while driving. FIG. 1 gives an exemplary illustration of such a technique, in which a vehicle 100 is equipped with a plurality of cameras 102, 104, 106 and 108 oriented to capture images of different perspectives from the location of the vehicle 100. Cameras 102, 104, 106 and 108 may be, for example, digital cameras with GPS capabilities, such that images captured by the cameras may be geotagged, i.e., encoded with metadata indicating the geographic location at which the images were captured. The geographic location may be indicated in any suitable form, for example as latitude and longitude coordinates.

Cameras 102, 104, 106 and 108 may be oriented on the vehicle 100 such that the combined images captured by all the cameras form a panoramic view of the vehicle's surroundings. For example, camera 102 may be oriented to capture an image 112 (FIG. 2) looking west from the vehicle 100, camera 104 may be oriented to capture an image 114 (FIG. 2) looking north from the vehicle 100, camera 106 may be oriented to capture an image 116 (FIG. 2) looking east from the vehicle 100, and camera 108 may be oriented to capture an image 118 (FIG. 2) looking south from the vehicle 100. In FIG. 1, the corresponding real-world locations depicted in images 112, 114, 116 and 118 are designated as 112', 114', 116' and 118', respectively. Although FIG. 1 shows a relatively simple configuration including four cameras, it should be appreciated that any number of cameras may be used to photograph any number of perspectives. For example, a typical configuration may utilize a rosette of eight cameras or more to provide more seamless transitions between adjacent images. Alternatively, panoramic images may be captured by a single panoramic camera.

Figure 2A:
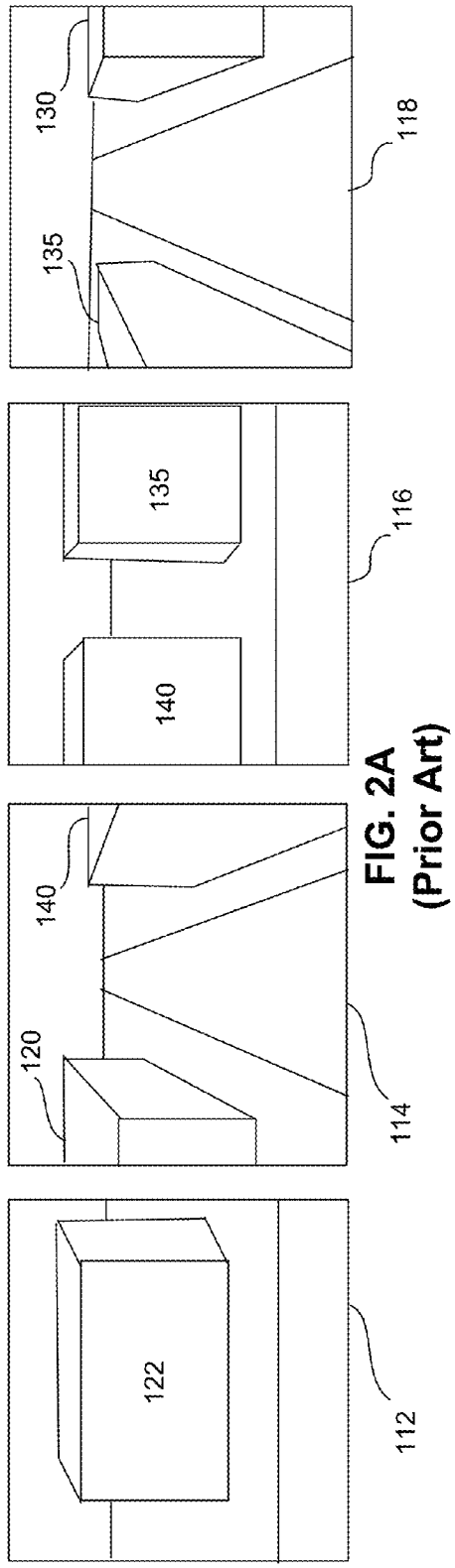
FIG. 2A illustrates exemplary portions of a street-level panoramic image for various view directions.

In the example of FIG. 1, cameras 102, 104, 106 and 108 may simultaneously capture images 112, 114, 116 and 118 when the vehicle 100 is at a certain geographic location, such that the combined images represent a 360-degree panorama of the first-person scene visible from that particular location at the time the images were captured. Image 112 represents the portion of the panoramic scene to the west, and may include a depiction of building 125. Image 114 represents the portion of the panoramic scene to the north, including building 120 and part of building 140. Image 116 represents the portion to the east, including parts of buildings 135 and 140, and image 118 represents the portion to the south, including building 130 and part of building 135. FIG. 2A illustrates the separate two-dimensional images 112, 114, 116 and 118 captured of the exemplary scene in FIG. 1. Each image presents a different perspective view of the scene from the location of vehicle 100.

Figure 2B:
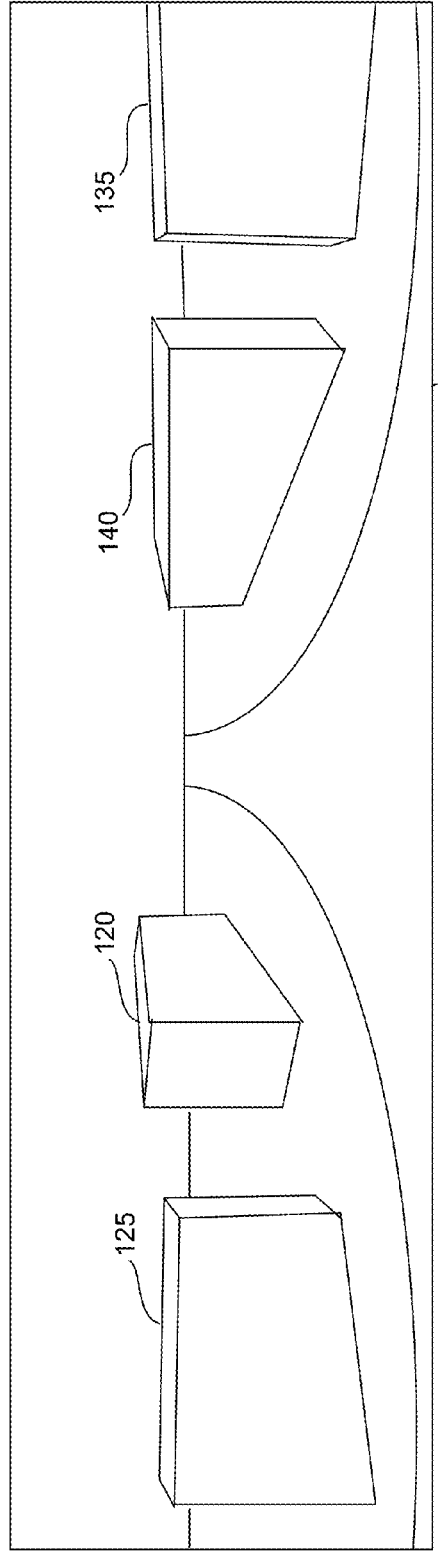
FIG. 2B illustrates an exemplary street-level panoramic image.

The separate images captured by the plurality of cameras may later be stitched together using known image stitching techniques to form a continuous multi-perspective panoramic image, as illustrated in FIG. 2B. A panoramic image may be any image or image data simultaneously and continuously representing multiple perspective views from a location. It should be appreciated that a panoramic image may encompass any range of viewing angles that includes multiple perspective views. For example, panoramic image 200 encompasses a 270-degree range of view, incorporating single-perspective images 112, 114 and 116 through image stitching. In some embodiments, street-level panoramic images for location browsing may encompass a full and continuous 360-degree range of view.

After capturing the panorama for one geographic location (along with the corresponding geotagging metadata), vehicle 100 may drive on to capture other panoramas at predefined intervals (e.g., at specified distances from each other). Each panorama represents a first-person multi-perspective view of the street-level scene visible from the geographic location at which that panorama was captured. A mapping application may have access to a large data store of panoramic images captured in such a fashion, such that a user can browse a location by navigating from panorama to panorama in an immersive virtual experience, as if the user were walking or driving along the streets of that location.

Figure 3:
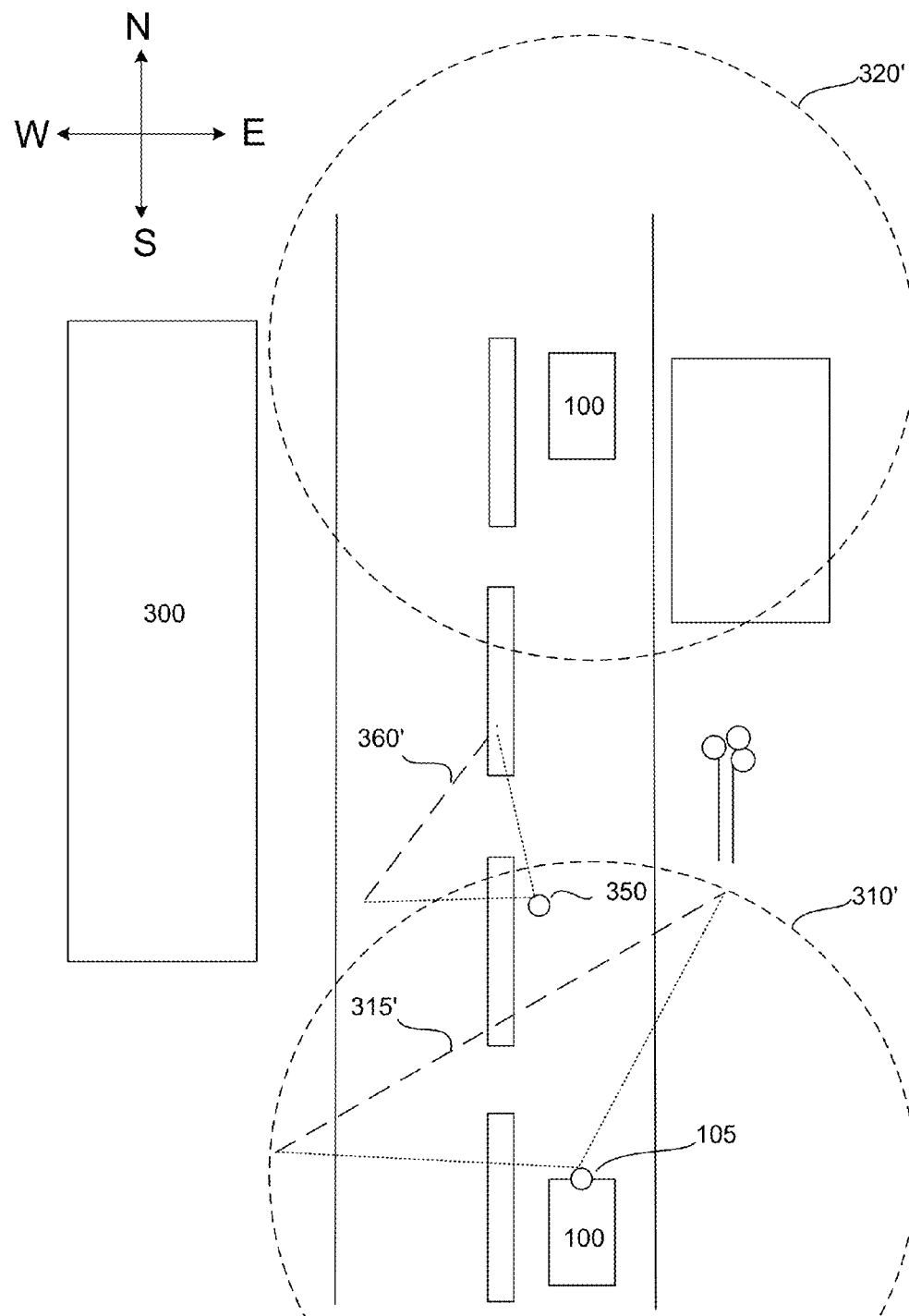
FIG. 3 illustrates an example of capturing street-level panoramic images and additional media objects, in accordance with some embodiments of the present disclosure.

FIG. 3 illustrates an example of vehicle 100 capturing successive panoramas at predefined intervals. For example, vehicle 100 may capture images to form panoramic image 310 at a geographical location toward the south end of FIG. 3, drive on and capture images to form panoramic image 320 at a next geographical location toward the north end of FIG. 3, and continue to drive on from there. In FIG. 3, the corresponding real-world locations depicted in panoramic images 310 and 320 are designated as 310' and 320', respectively. Each of the resulting panoramic images 310 and 320 may be stitched from multiple smaller images to form a continuous 360-degree panoramic image, any arbitrary portion of which may be viewed by a user of a software application, as if the user were virtually viewing the street-level scene from a particular view direction from that location. For example, image portion 315 (depicting corresponding real-world location 315') represents a portion of panoramic image 310 that may be displayed to a user desiring to view a scene including building 300 from a first-person perspective. The image portion 315 may be rendered in a viewport of the software application as if it had been captured by a particularly oriented virtual camera 105 within the panorama.

Figure 4:
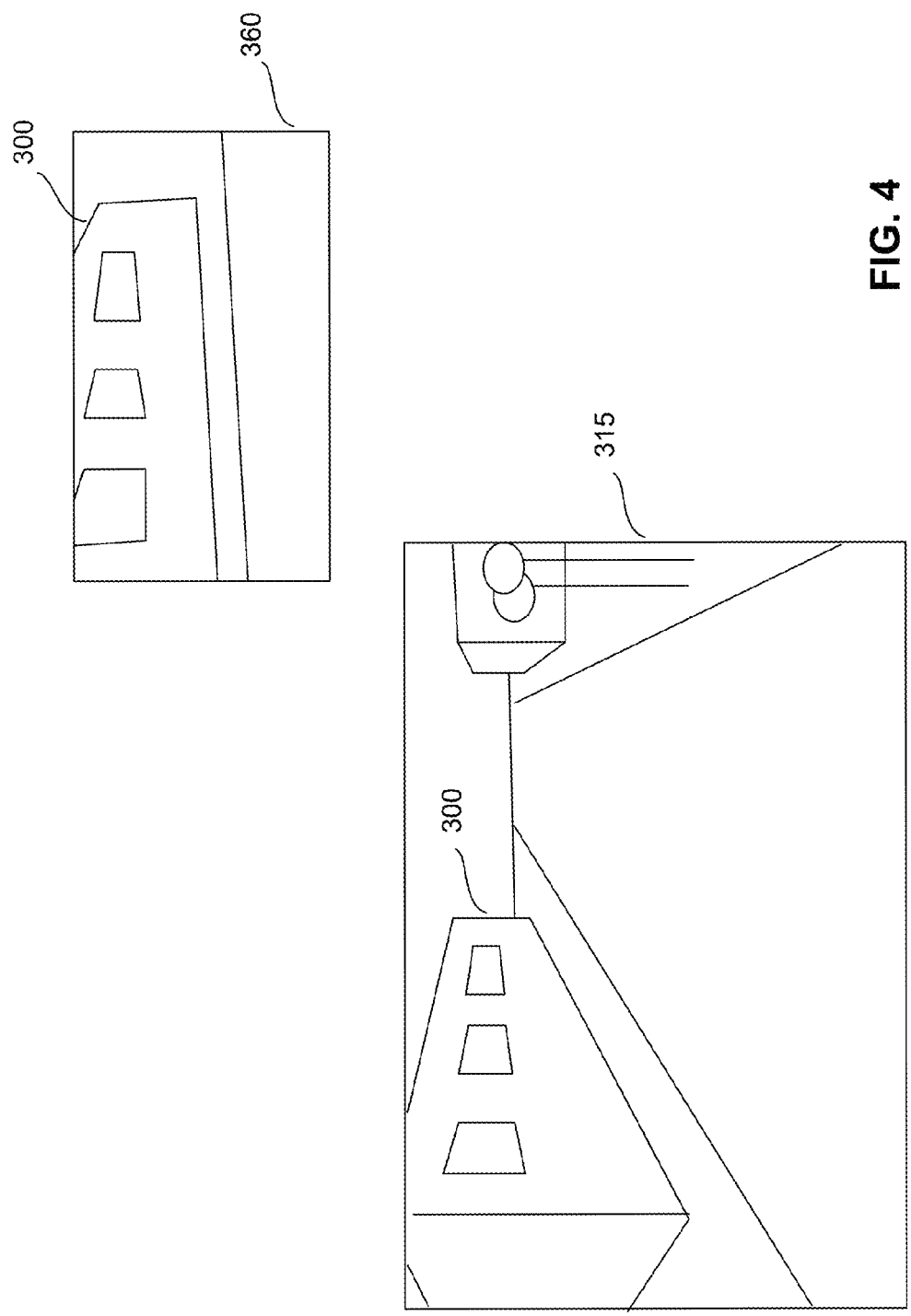
FIG. 4 illustrates an exemplary street-level panoramic image and an exemplary additional media object, in accordance with some embodiments of the present disclosure.

At a time that may be unrelated to the time of vehicle 100's panorama capturing, another person such as pedestrian 350 may capture an additional media object 360 (depicting corresponding real-world location 360') from a geographical location near to that of panoramic image 310. Additional media object 360 may be, for example, a digital photograph or video taken by pedestrian 350, capturing a view of the same building 300 that was captured in panoramic image 310, and particularly in image portion 315 of panoramic image 310, as illustrated in FIG. 4. Additional media object 360 may be captured by a camera that is also GPS-enabled, such that it is automatically geotagged with metadata indicating the geographic location at which it was taken. It should be appreciated, however, that additional media objects may be tagged using any suitable approach. For example, pedestrian 350 may geotag the additional media object 360 later, using tagging software. Additional media object 360 may also be tagged with metadata indicating other parameters of the media object, such as the time at which it was taken, the author who created it, and its subject (e.g., building 300), among other parameters.

While browsing nearby locations in street view mode, or while browsing through various additional media objects, a user may desire to view additional media object 360 in the context of its closest street-level panoramic image, i.e., panoramic image 310. Accordingly, some embodiments of the present disclosure provide for viewing such additional media objects embedded in the context of street-level panoramic images. The additional media objects may be embedded in such a way to align features of the additional media object with features of the panoramic image, such that physical correspondences and orientations may be easily appreciated by the viewer.

Figure 5:
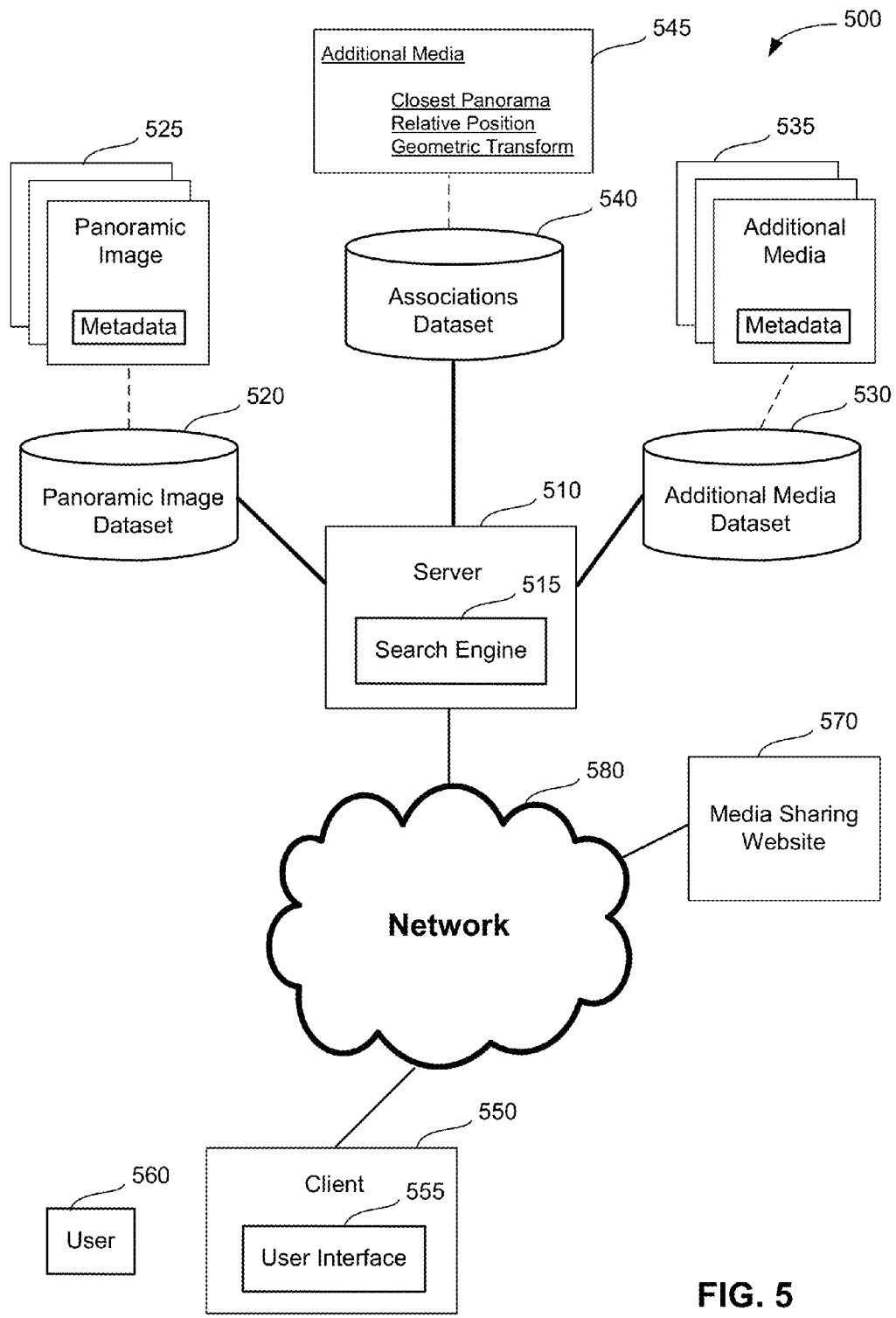
FIG. 5 is a block diagram illustrating an exemplary distributed system for use in practicing some embodiments of the present disclosure.

FIG. 5 is a block diagram illustrating an exemplary system 500 for use in practicing some aspects of the present disclosure. Distributed system 500 includes a server 510 that may, through network 580, transmit data to and receive data from a client 550 operated by a user 560. Network 580 may be any network or combination of networks capable of carrying data communication, including, but not limited to, a local area network, a medium area network, and/or a wide area network such as the Internet. Client 550 may be a computing device operatively connected to one or more processors, local memory, one or more displays, and one or input devices such as a keyboard or a mouse. Client 550 may have any suitable form or function and may be a portable device, such as a mobile handset or a personal digital assistant (PDA). Similarly, server 510 may be implemented using any combination of one or more computing devices capable of serving data to client 550.

Server 510 may have access to a panoramic image dataset 520 and an additional media dataset 530, which may be implemented using one or more computer-readable storage media. It should be appreciated that panoramic image dataset 520 and additional media dataset 531) may be implemented on a single computer-readable medium or on separate computer-readable media, and that each individual dataset may be implemented on a single or multiple computer-readable media. Panoramic image dataset 520 may store data representing one or more panoramic images 525, each of which may be encoded with corresponding metadata. The metadata may include a geotag identifying the geographic location at which the panoramic image was captured. Panoramic images 525 may be captured using any of various known techniques, as described above, and may be stored in panoramic image dataset 520 for use by a mapping application. Panoramic images 525 may be any type of panoramic images representing multiple perspective views. For example, panoramic images 525 may include street-level panoramic images of outdoor scenes, such as may be captured from the streets of a city. Panoramic images 525 may also include panoramic images of indoor scenes, such as may be captured for a virtual tour of a building.

Additional media dataset 530 may store data representing one or more additional media objects 535. Additional media objects 535 may include any of various forms of media data having an image component, such as digital photographs or other digital images or video, and may include audio and/or other components. Additional media objects 535 may be obtained from any of various sources accessible through network 580, such as media sharing website 570. Examples of media sharing websites are the FLICKR® website and the PANORAMIO® website. Additional media objects 535 may be encoded with metadata, including geotagging metadata identifying the geographical locations at which additional media objects 535 were captured. The metadata may alternatively or additionally indicate other parameters of an additional media object, such as its author, subject, and/or time at which it was captured. The additional media objects 535 may be encoded with metadata automatically or manually, by the author, a capturing device, or a third party, at the time they are captured or later using any of various known forms of tagging software.

Server 510 may also have access to an associations dataset 540, which may be implemented separately or contiguously with panoramic image dataset 520 and/or additional media dataset 530 on one or more computer-readable storage media. Associations dataset 540 may store data pertaining to associations between one or more additional media objects 535 and one or more panoramic images 525. For each image frame of an additional media object 535, associations dataset 540 may store data identifying the closest panorama and projection data including a corresponding relative position and geometric transform. The closest panorama may be identified as the panoramic image 525 having a corresponding geographic location (indicated by its metadata) closest to the geographic location of the frame of additional media object 535. The closest panorama may be indicated in the associations dataset 540 in any suitable form, such as by its geographic location or by a unique identifier assigned to the closest panoramic image 525. Projection data including a relative position and geometric transform include such data as will be required to properly embed frames of additional media objects 535 in their closest panoramic images 525, as will be described below. Associations dataset 540 may also store data indicating multiple associated frames of additional media objects 535 for each panoramic image 525.

Server 510 may be programmed with computer-executable instructions to determine associations between additional media objects 535 and panoramic images 525, embed associated additional media objects 535 within panoramic images 525 to produce hybrid panoramic images, and transmit hybrid image data in response to user input received from client 550 through network 580. Server 510 may also be operatively connected to a search engine 515, which may be programmed with computer-executable instructions to retrieve links to appropriate panoramic images 525 and/or additional media objects 535 in response to user input such as search queries.

Client 550 may be configured to provide a user interface 555 through which user 560 may interact with and navigate through a virtual environment represented by first-person street-level panoramas. User interface 555 may include a viewport panel in which panoramic image data may be displayed to user 560. At any given time, the viewport may display image data, received from server 510, representing a portion of a panoramic image 525 or a hybrid panoramic image in accordance with a particular view direction. For example, image 315 from FIG. 4 could be rendered in the viewport to display the portion of panoramic image 310 from FIG. 3 representing a view direction to the northwest. User interface 555 may provide a plurality of buttons, arrows, links, input fields and/or other navigation icons to allow user 560 to rotate the view direction of a particular panorama or to move to a panorama of an adjacent geographic location. Such a user interface may be implemented using techniques as are known in the art. Client 550 may transmit user navigation input to server 510, in response to which server 510 may transmit accordingly updated image data to client 550 to be rendered in the viewport of user interface 555.

User interface 555 may also provide one or more additional panels, such as an information panel and/or a search panel, to provide one or more alternative methods of navigation to user 560. For example, an information panel may provide thumbnails and/or links to suggested geographic locations, landmarks, and/or additional media objects that user 560 may desire to view. In response to user input such as clicking on a link to a suggested geographic location, server 510 may provide hybrid image data to be rendered in the viewport of user interface 555. The hybrid image data may be produced from a panoramic image 525 for that location, embedded with one or more image frames of additional media objects 535 associated with that location. In response to user input such as clicking on a thumbnail of a suggested additional media object, server 510 may provide hybrid image data produced by embedding that additional media object 535 in its associated panoramic image 525.

User interface 555 may also provide a search field, in which user 560 may input a search query for a desired item to view. For example, user 560 may input a search query related to desired additional media objects. User 560 may search for additional media objects to view based on any of various parameters, such as an author of additional media objects, a subject of additional media objects, a time at which additional media objects were captured, and/or a location at which additional media objects were captured. In response to receiving the user request, server 510 may utilize search engine 515 to query the metadata of additional media objects 535 in additional media dataset 530 for the appropriate parameters. A list of matching additional media objects may then be provided to user 560 in the information panel of user interface 555, optionally filtered using any of various methods known in the art. In response to user 560 selecting an additional media object from the list, server 510 may produce the appropriate hybrid image data and provide it for display in the viewport of user interface 555.

Figure 6:
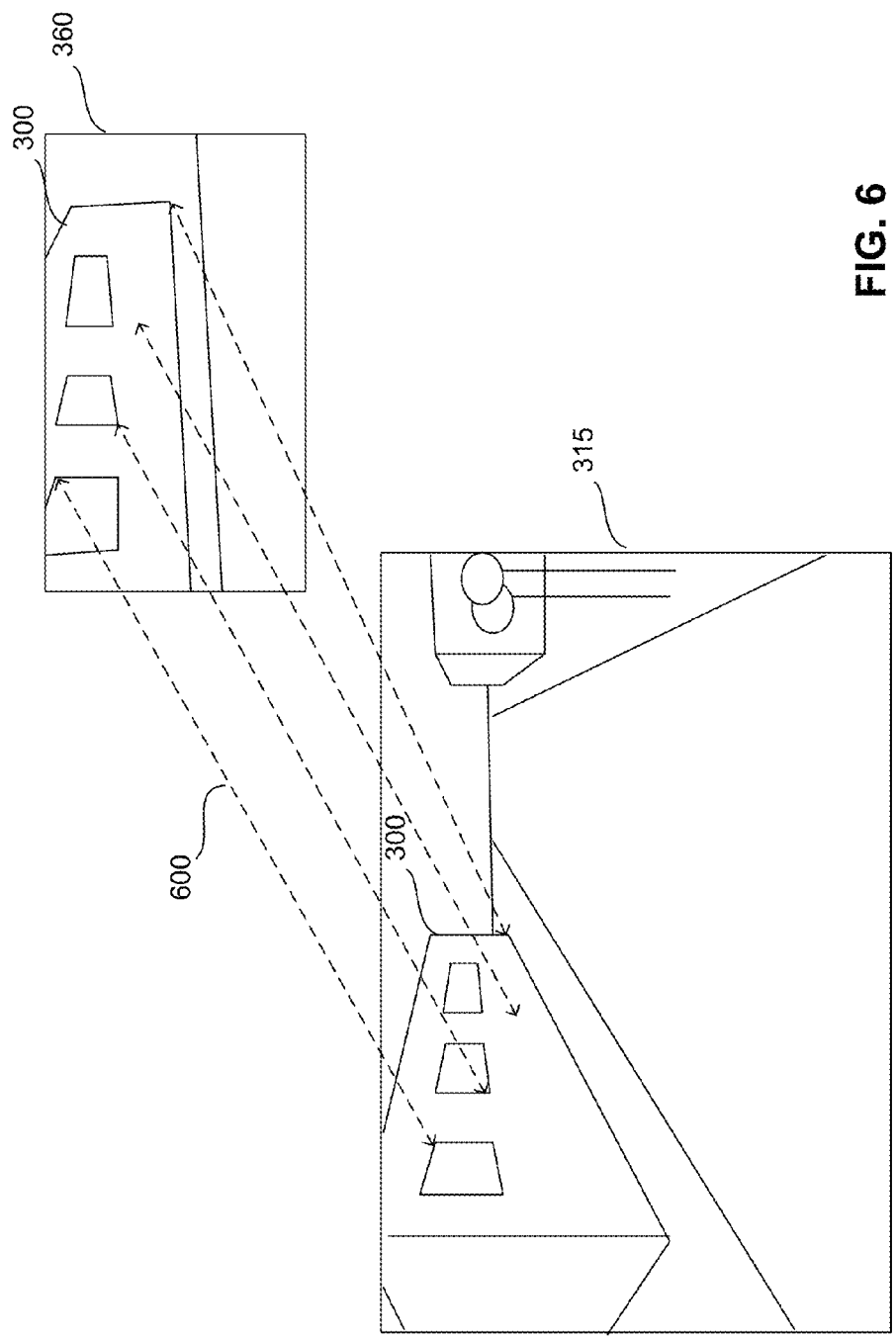
FIG. 6 illustrates an example of feature matching, in accordance with some embodiments of the present disclosure.
Figure 7:
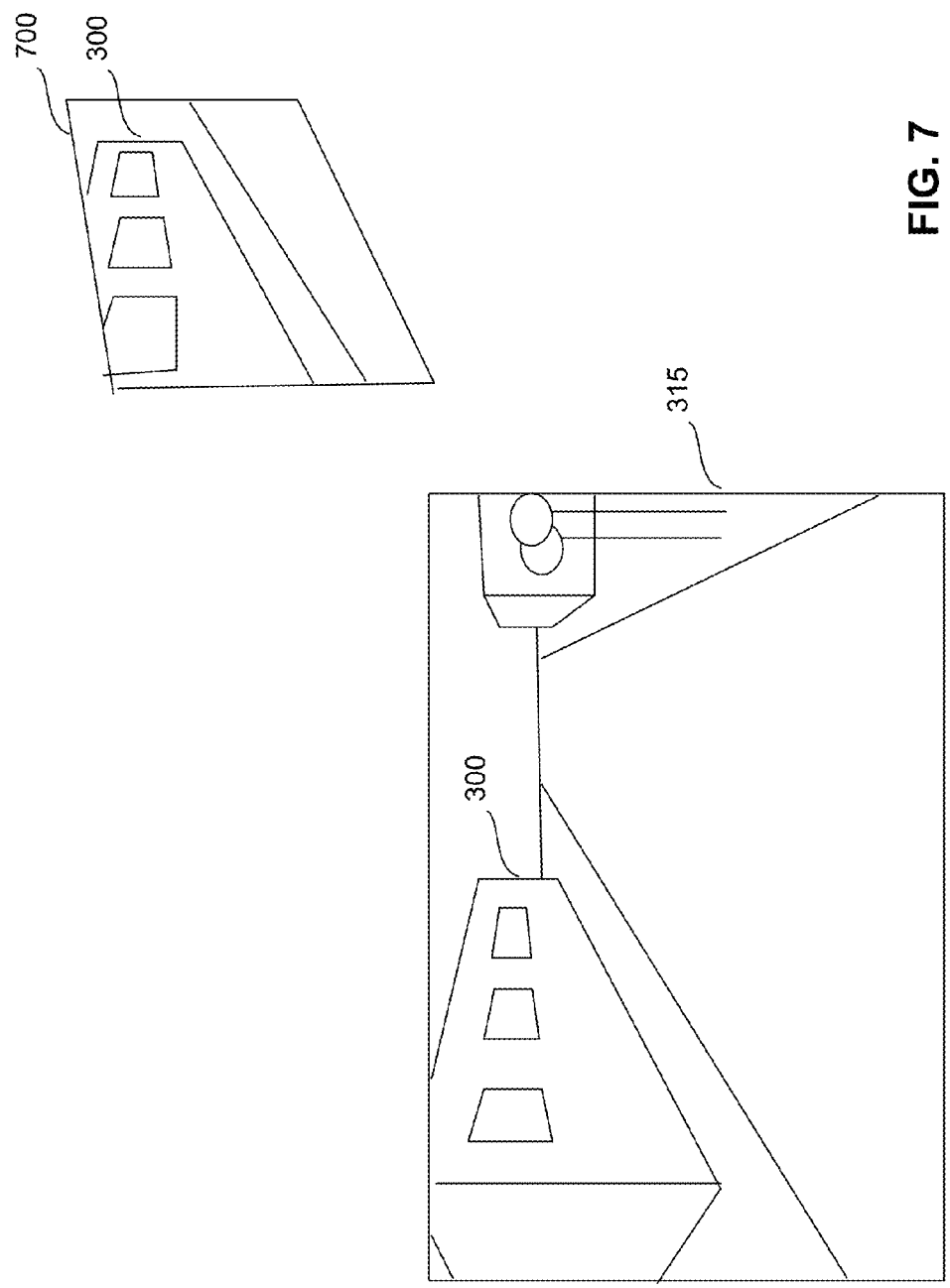
FIG. 7 illustrates an example of a transformation of an additional media object, in accordance with some embodiments of the present disclosure.
Figure 8:
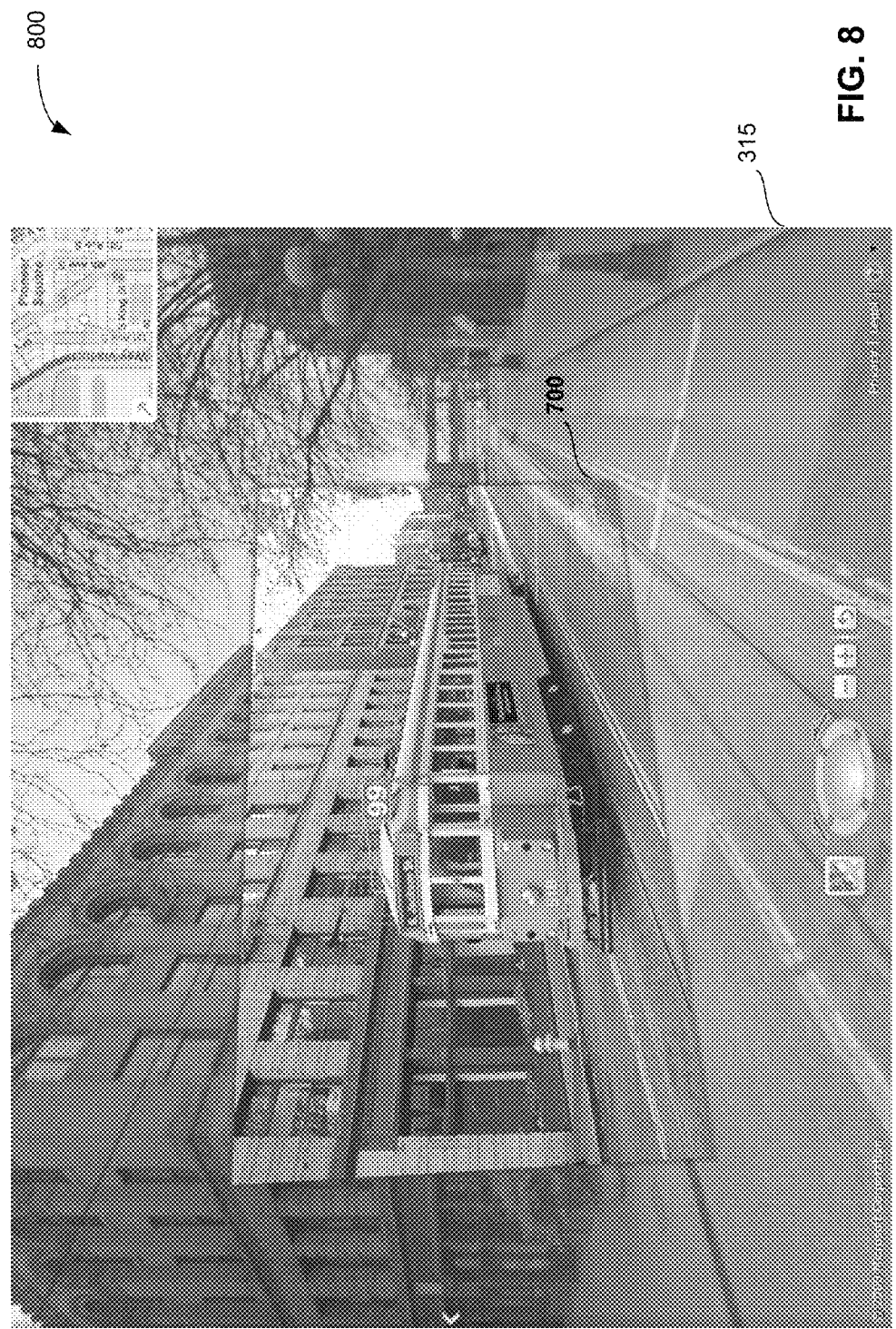
FIG. 8 is a sketch of an exemplary viewport displaying hybrid image data, in accordance with some embodiments of the present disclosure.

FIGS. 6-8 illustrate exemplary processing stages of producing hybrid image data by embedding an additional media object in a panoramic image, in accordance with some embodiments of the present invention. In FIG. 6, image 360 represents a frame of an additional media object, such as the additional media object captured by pedestrian 350 in FIG. 3. In the case of, for instance, a digital photograph, image 360 may be the full image data of the additional media object, not including its metadata. In the case of, for example, a digital video, each image frame of the additional media object may be embedded separately in a panoramic image. If the video was captured with the camera standing still, the image frames may overlap atop one another in the same panoramic image. When the hybrid image data is displayed to user 560 through user interface 555, the video may be played within the context of its associated street-level panoramic image in the viewport. Alternatively, user 560 may elect to step through the video frame by frame to view it as individual embedded images. If the video was captured with a moving camera, different image frames of the video may be embedded in different relative positions within the same panoramic images, and/or may be embedded across different panoramic images, according to the different geographic locations at which different image frames were captured. When the hybrid image data is displayed to user 560, the image frames may be viewed as separated out in space, and the user may navigate along the image frames by rotating the view direction within a panorama and/or moving to successive panoramas. Alternatively, the video may be played in time in a fixed orientation within the viewport, and the surrounding panoramic image data may be continuously updated as the video progresses. It should be appreciated that the additional media object may also include data in formats other than image data, such as audio data included in a video object, that may also be provided through user interface 555. Photographic additional media objects may also include audio data, such as voice annotations included in their metadata.

With continued reference to FIG. 6, image 315 represents a portion of a panoramic image, such as panoramic image 310 from FIG. 3. Although only a portion of panoramic image 310 is depicted in FIG. 6, it should be appreciated that processing to produce hybrid image data may also operate on data representing an entire panoramic image, which may encompass up to a full 360 degrees of view direction. In the example of FIG. 6, panoramic image portion 315 includes a depiction of building 300, which is a subject of the image. Building 300 is also a subject of additional media object image frame 360, although it is depicted from the point of view of a slightly different geographic location. Based on the geographic location identified by the metadata of additional media object image frame 360, panoramic image 310 (including image portion 315) is identified as corresponding to the closest panorama in the association data for the additional media object.

Processing to produce hybrid image data by embedding additional media object frame 360 in panoramic image 310 may be performed in such a way to align one or more depictions in additional media object frame 360 (e.g., that of building 300) with the corresponding depictions in panoramic image 310, such that physical correspondences may be appreciated by the viewer. Such processing may be implemented by one or more processors, for example of a computer-implemented server, encoded with computer-executable instructions directing the one or more processors to perform the processing steps. The processing may involve any of various known image matching or image registration techniques, examples of which are described in U.S. patent application Ser. No. 12/478569, filed Jun. 4, 2009, entitled "Geocoding by Image Matching".

Following techniques such as the examples described above, a plurality of points of interest (i.e., areas of an image having certain mathematical characteristics) may be identified in each of panoramic image 310 and additional media object image frame 360. Based on feature vectors computed for each point of interest, points of interest in additional media object image frame 360 may be matched to corresponding points of interest in panoramic image 310. Matched points of interest represent likely mappings between features of a panoramic image and features of an additional media object frame that depict the same scene or physical subject. In the example of FIG. 6, matched points of interest, indicated by arrows 600, provide a likely mapping between additional media object frame 360 and panoramic image portion 315 that may be used to properly align the two depictions of building 300.

From the matched points of interest, a default view direction and a relative position may be determined for additional media object frame 360 with respect to panoramic image 310. For example, the positions of matched points of interest in panoramic image 310 may provide an indication that the view direction corresponding to panoramic image portion 315 is an appropriate default view direction for additional media object frame 360 if the number of matched points of interest visible in the viewport is maximized according to some criteria for that view direction. In addition, the matched points of interest may indicate with measurable precision the relative position at which additional media object frame 360 should optimally be embedded within panoramic image portion 315.

Matched points of interest may next be used to determine a geometric transform that best aligns the matched points of interest in additional media object frame 360 with the corresponding matched points of interest in panoramic image portion 315. Any suitable form of geometric transform may be utilized. In some embodiments, the geometric transform is specified as a homography, a planar model transformation that maps straight lines to straight lines and may be particularly appropriate for images depicting building facades. The geometric transform for additional media object frame 360 may be determined as the transform that optimally projects the matched points of interest of additional media object frame 360 onto the matched points of interest of panoramic image portion 315. For example, the optimal geometric transform may be the homography to which the most matched points of interest conform, with the fewest non-conforming outliers. It should be appreciated, however, that any suitable transform may be employed. The determined geometric transform may then be stored as projection data for additional media object frame 360, along with the determined relative position and optionally the determined default view direction.

The geometric transform may be applied to additional media object frame 360 to produce an adjusted additional media object frame 700, as illustrated in FIG. 7. Adjusted additional media object frame 700 is a geometrically transformed version of additional media object frame 360, and is optimally aligned according to some criteria as described above to reveal physical correspondences between the scene (including building 300) depicted in both adjusted additional media object frame 700 and panoramic image portion 315. Adjusted additional media object frame 700 may then be embedded in panoramic image portion 315 in accordance with the relative position determined as described above. The embedding may replace the underlying area of panoramic image portion 315 with the image data of adjusted additional media object frame 700 to produce hybrid image data 800, as illustrated in FIG. 8. It should be appreciated, however, that any suitable approach may be used for the embedding, including, for example, forming a composite image that shows the adjusted additional media object frame 700 as semi-transparent, or employing other image processing techniques to form an average or blended representation. In some embodiments, the hybrid image data may display only part of the embedded adjusted additional media object frame, such as a particular subject of interest within the additional media object frame. For example, the depiction of the trolley car in adjusted additional media object frame 700 may be embedded in panoramic image portion 315 while fading out or removing some or all of the depiction of building 300 contributed by adjusted additional media object frame 700.

Hybrid image data may present the surrounding scene of a street-level panoramic image, such as panoramic image 310, embedded with one or more image frames of one or more additional media objects depicting an area of the same scene, perhaps taken from a slightly different vantage point or at a different time. In the example of FIG. 8, adjusted additional media object frame 700 depicts a trolley car, which may not have been present in the original panoramic image 310. Hybrid image data 800, when provided by server 510 and displayed by client 550 through user interface 555, may allow the user to view the image of the trolley enhanced with the context of the surrounding scene of the panorama. The system may also maintain the embedding of adjusted additional media object frame 700 in panoramic image 310 while allowing the user to rotate the view direction and navigate within the panorama. For example, if user 560 operates user interface 555 to rotate the view direction such that adjusted additional media object frame 700 should begin to move outside of the field of view of the viewport, server 510 may provide updated hybrid image data containing the appropriate portions of adjusted additional media object frame 700 and panoramic image 310 with the relative position and embedding maintained. It should be appreciated, however, that processing to render a hybrid panoramic image from a different view direction need not necessarily be performed on server 510. For example, server 510 may provide client 550 with a full hybrid panoramic image in which adjusted additional media object frame 700 has been embedded, and client 550 may render appropriate portions of the hybrid panoramic image in the viewport of user interface 555 in accordance with user-specified view directions.

Figure 9:
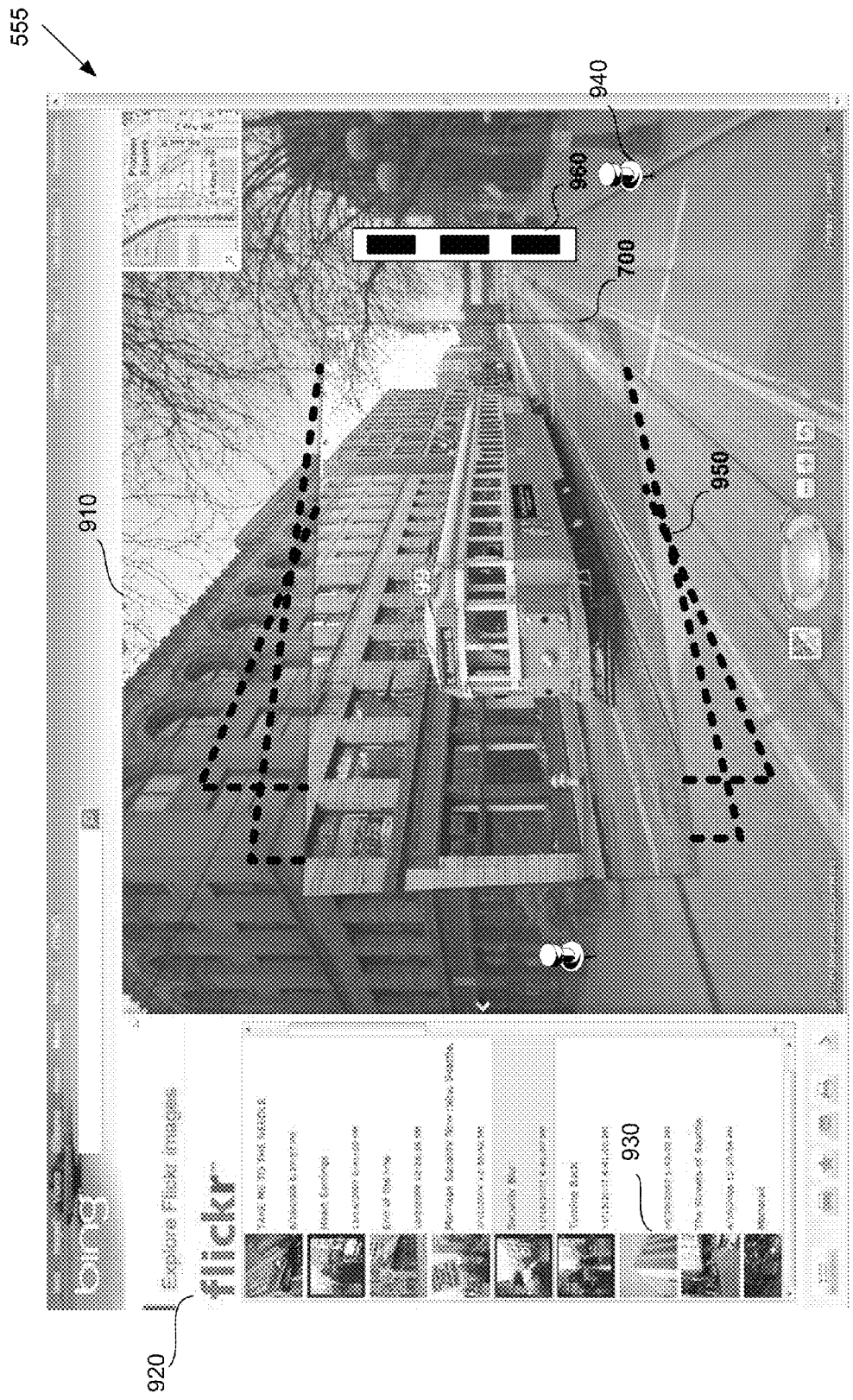
FIG. 9 is a sketch of an exemplary user interface through which scrubbing of additional media objects may be performed, in accordance with some embodiments of the present disclosure.

FIG. 9 is a sketch of an exemplary user interface 555 through which hybrid image data may be displayed to a user in a viewport panel 910. User interface 555 may be implemented by one or more processors of client 550, in accordance with computer-executable instructions encoded on one or more computer-readable storage media. The one or more processors of client 550 may be programmed to transmit user input received through user interface 555 to server 510, and to receive hybrid image data from server 510 and display it to the user through user interface 555. Server 510 similarly may include one or more processors encoded with computer-executable instructions to transmit appropriately produced hybrid image data for display in viewport 910 in response to receiving any of various forms of user input supported by user interface 555.

For example, a user may enter a particular geographic location that the user would like to view at street level. This user input may be received by one or more processors of client 550 through user interface 555 and transmitted to server 510. In response to receiving the user input, one or more processors of server 510 may determine a closest panoramic image for the location specified by the user input, one or more additional media objects associated with the panoramic image, and a view direction in which to display the panoramic image. If the user does not specify the view direction, it may be determined automatically by the one or more processors of server 510 in any various suitable ways. For example, the view direction may have a default value, such as due north, for any panoramic image. Alternatively or additionally, a particular panoramic image may have its own default view direction, such as the direction of a major street or a landmark. The view direction may also be determined as the optimal viewing direction for completely displaying an additional media object embedded in the panoramic image.

User interface 555 may also include an information panel 920, in which a list of available additional media objects for a current geographic location (and its corresponding panorama) may be displayed through the execution of program instructions by one or more processors of client 550 and/or server 510. The list may include textual labels and/or descriptions of available additional media objects and/or visual indications such as thumbnail pictures. If the user selects a link in the list, such as by clicking on thumbnail 930, a new view direction may be determined in accordance with the additional media object represented by thumbnail 930, and updated hybrid image data may be displayed in viewport 910, including the additional media object of thumbnail 930 embedded in the current panorama.

Alternatively or additionally, processing instructions executed by client 550 and/or server 510 may cause one or more additional media objects associated with a current panorama to be indicated, without being explicitly displayed, by any of various forms of visual indicators superimposed on the panoramic image portion displayed in viewport 910. For example, an icon such as pushpin 940 may be displayed near the relative position at which an additional media object frame would be embedded in the panoramic image. If the user clicks on pushpin 940, the view direction may be rotated to face pushpin 940, and updated hybrid image data with the corresponding additional media object embedded may be provided.

Visual indicators of available additional media object frames may also be provided in the form of footprint frames, such as footprint frame 950. Footprint frames may be displayed as shape outlines delineating the area of a panoramic image that an embedded additional media object would replace in the corresponding hybrid image (i.e., the additional media object's footprint). If multiple additional media object footprints overlap, as footprint frame 950 does with adjusted additional media object frame 700, a scrub bar 960 may be provided to allow the user to scrub through the overlapping additional media object frames. While one additional media object frame is embedded and displayed, the other overlapping additional media object frames may be represented by their footprint frames, such as footprint frame 950. If the user selects a different additional media object frame to view using scrub bar 960, the previous additional media object frame may be represented by a footprint frame, and new hybrid image data with the selected additional media object frame embedded may be displayed. Overlapping additional media object frames may come from different additional media objects captured around the same location and relative position, and/or may come from successive image frames in a video additional media object.

Figure 10:
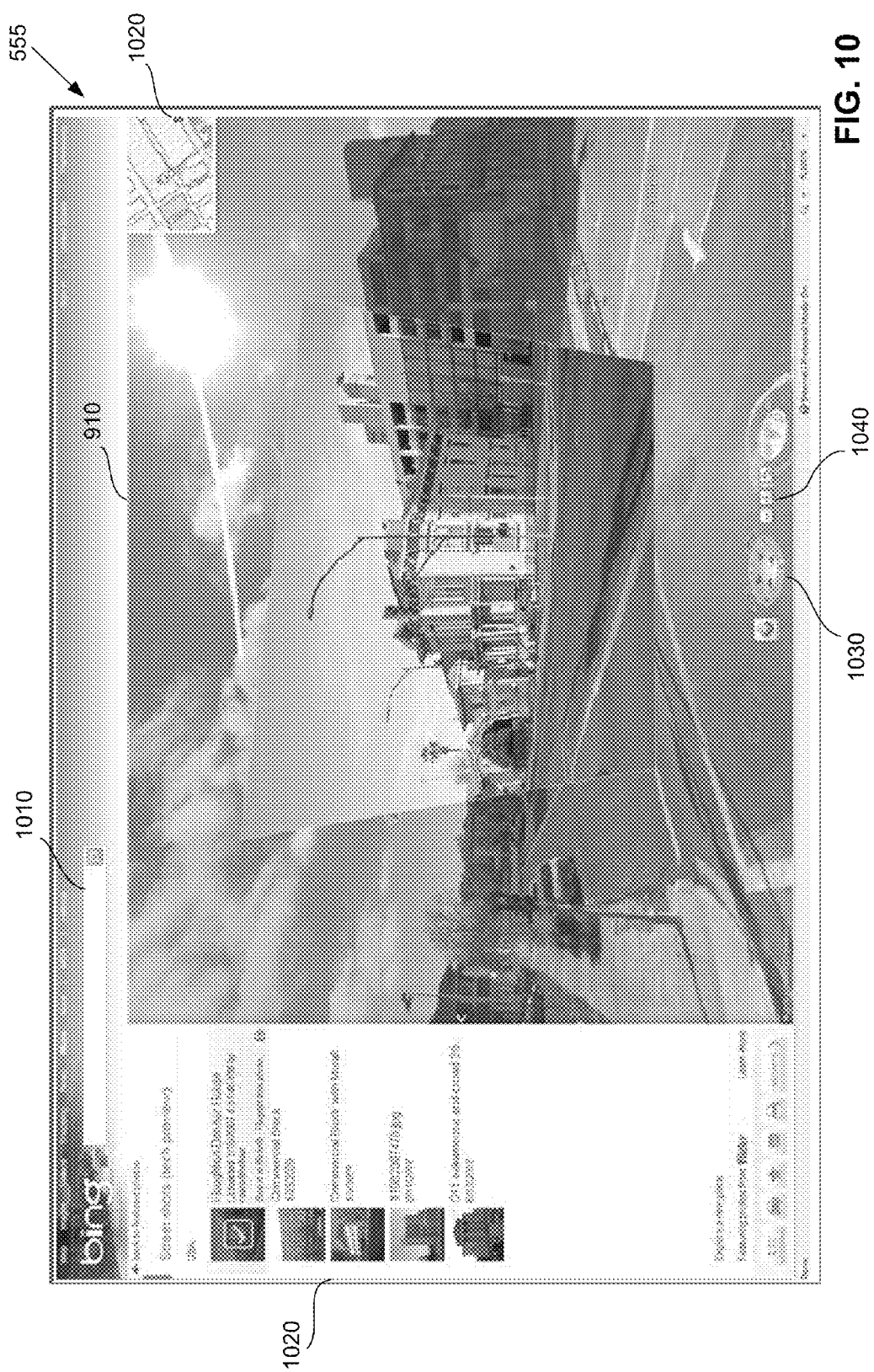
FIG. 10 is a sketch of an exemplary user interface through which a search for additional media objects may be performed, in accordance with some embodiments of the present disclosure.

User interface 555, implemented by one or more processors of client 550, may also provide the user with other options for navigating through geographic locations and/or additional media objects, as illustrated in FIG. 10. For example, user interface 555 may include a search field 1010 in which the user may enter search queries related to geographic locations, places of interest, and/or additional media objects. To search for additional media objects that the user may wish to view, the user may enter a search query related to one or more parameters of the additional media objects, such as a location at which they were captured, a time at which they were captured, an author who captured them, or a subject they depict. In response to such a search query, server 510 may utilize search engine 515 to return a list of matching additional media objects according to their metadata. The list may be displayed in the information panel 920 of user interface 555, and the user may select an additional media object from the list to view in its street-level context. In response to such a selection, server 510 may, through computer program actions of one or more processors, determine the appropriate additional media object, panoramic image and view direction, and provide appropriate hybrid image data for display in viewport 910.

User interface 555 may also include any number and forms of navigational icons, buttons, arrows, links, or other selectable items for the user's use in navigating through location, in the virtual environment. For example, user interface 555 may include directional and rotational arrow buttons 1030, which may allow the user to navigate within and between panoramas. Rotational arrows may allow the user to update the view direction within a current panorama, in response to which one or more processors of server 510 may provide updated hybrid image data while maintaining appropriate embedding of any additional media object frames displayed within the range of view of the viewport 910. Directional arrows may allow the user to update the geographical location by virtually moving to an adjacent panorama, in response to which server 510 may provide updated hybrid image data in a similar fashion as when the user enters an arbitrary geographic location. When a new geographic location results from movement from an adjacent geographic location, the view direction may be maintained from its previous value.

User interface 555 may also provide a road map panel 1020 indicating a current geographic location on an orthographic projection map. If the user clicks on a different geographic location on the road map 1020, updated hybrid image data may be provided for the new geographic location. User interface 555 may also provide zoom buttons 1040, which may allow the user to control the zoom level (i.e., the viewport range of view and image resolution) of the current panorama. In response to user input to change the zoom level, server 510 may provide appropriately updated hybrid image data, maintaining the embedding of any additional media objects within the range of view in spite of changes in image size and resolution.

Figure 11:
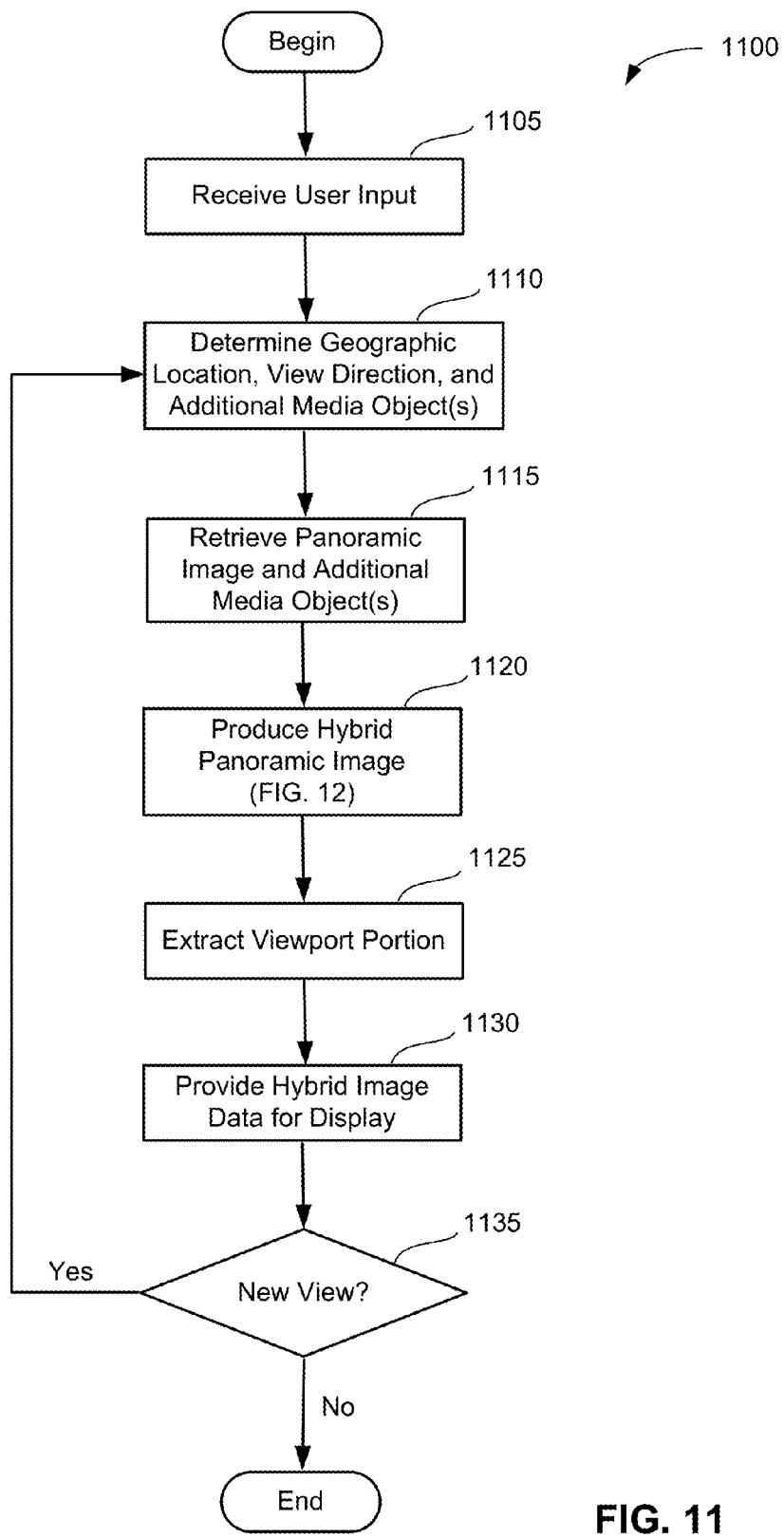
FIG. 11 is a flow diagram illustrating an exemplary method of providing hybrid image data for display, in accordance with some embodiments of the present disclosure.

FIG. 11 is a flow diagram illustrating an exemplary method 1100 of providing hybrid image data for display, in accordance with some embodiments of the present disclosure. The method may be implemented, for example, by one or more computers including one or more processors executing instructions encoded on one or more computer-readable storage media. The processing may occur on any combination of processors operatively connected to server 510 and/or client 550. Method 1100 begins at act 1105, at which user input is received in any of various forms, as described above. For example, user input may be a search query, a selection of a link to a location or an additional media object, or a selection of a navigational option.

At act 1110, in response to the user input, a geographic location, view direction and one or more additional media objects may be determined. If any of the three are not directly specified by the user input, they may be determined automatically or may be inferred from other user inputs. For example, if the user input specifies a geographic location, the panoramic image captured nearest to that location may be identified, and one or more additional media objects associated with that panoramic image may be identified using the associations dataset. The view direction may be determined based on a default value, as described above, or based on an optimal view direction corresponding to one or more of the associated additional media objects. If the user input specifies an additional media object, the associated geographic location may be determined from the additional media object's metadata, and an optimal view direction with reference to the closest panorama may be determined using the associations dataset. If the user input specifies only a view direction, the geographic location currently being displayed to the user may be maintained, and associated additional media objects may be determined using the associations dataset as their relative positions fall within the range of view determined by the view direction.

At act 1115, a panoramic image may be retrieved from the panoramic image dataset, and one or more associated additional media objects may be retrieved from the additional media dataset, in accordance with the geographic location, view direction and additional media object(s) determined at act 1110. At act 1120, frames of the retrieved additional media object(s) may be embedded in the associated panoramic image to produce a hybrid panoramic image. An exemplary method for producing a hybrid panoramic image through such embedding will be described below with reference to FIG. 12. With continued reference to FIG. 11, at act 1125, a portion of the hybrid panoramic image corresponding to the range of view to be displayed in the viewport in accordance with the view direction may be extracted. At act 1130, hybrid image data representing this portion of the hybrid panoramic image may be provided for display in the viewport of the user interface.

At act 1135, a determination may be made as to whether a new view is required. A new view may be required in response to any of various events. For example, new user input may be received that specifies a change to the geographic location, the view direction and/or the additional media object(s). This new user input may be received in any of the various forms described above. A new view may also be required in response to an event such as a progression in time of playback of a video additional media object. If the video additional media object was captured with a moving camera, a new view direction and/or a new geographic location may be implied between the display of successive frames. If the determination at act 1135 is that a new view is required, method 1100 may loop back to act 1110, at which the new geographic location, view direction and/or additional media object(s) may be determined. If the determination is that no new view is required, method 1100 ends.

Figure 12:
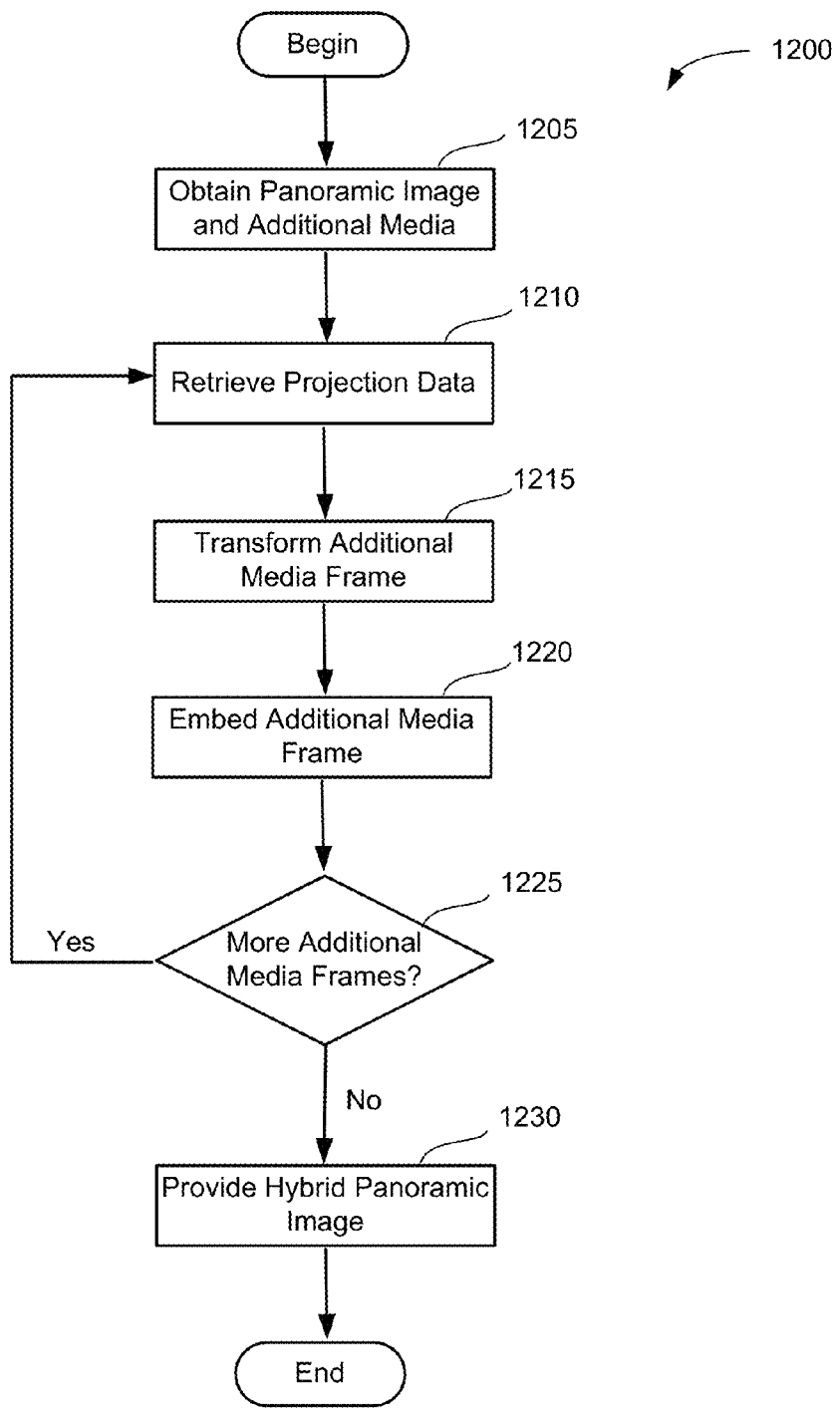
FIG. 12 is a flow diagram illustrating an exemplary method of producing a hybrid panoramic image, in accordance with some embodiments of the present disclosure.

FIG. 12 is a flow diagram illustrating an exemplary method 1200 of producing a hybrid panoramic image, in accordance with some embodiments of the present disclosure. The method may be implemented, for example, by one or more computers including one or more processors executing instructions encoded on one or more computer-readable storage media. The processing may occur on any combination of processors operatively connected to server 510 and/or client 550. Method 1200 begins at act 1205, at which a panoramic image and one or more associated additional media objects are obtained, for example as at act 1115 of method 1100. At act 1210, projection data for a frame of an additional media object is retrieved, for example from the associations dataset. As described above, projection data for an additional media object frame may include a relative position with respect to the associated panoramic image and a geometric transform that projects the additional media object frame with the appropriate alignment onto the panoramic image. An exemplary method for computing such data will be described below with reference to FIG. 13.

With continued reference to FIG. 12, at act 1215, the geometric transform may be applied to the additional media object frame to produce an adjusted additional media object frame. At act 1220, this adjusted additional media object frame may be embedded within the panoramic image in accordance with the relative position. At act 1225, a determination may be made as to whether more additional media object frames remain to be embedded within the current panoramic image. For example, further additional media object frames may belong to a video to which the first additional media object frame also belongs, or to other additional media objects captured near the same geographic location. The number of available additional media object frames to be embedded within a single hybrid panoramic image may be determined based on any of various factors, such as system configuration parameters, display capabilities of the user interface, user preferences, or other considerations. If more additional media object frames are available but not selected to be embedded, their availability may be indicated to the user through other visual indicators, such as lists, pushpins and footprint frames, as discussed above.

If the determination at act 1225 is that more additional media object frames remain to be embedded, method 1200 may loop back to act 1210, at which projection data for the next additional media object frame may be retrieved. If the determination is that no more additional media object frames remain to be embedded, method 1200 may proceed to act 1230, at which the hybrid panoramic image containing the previously embedded additional media object frames may be provided to further processing stages.

Figure 13:
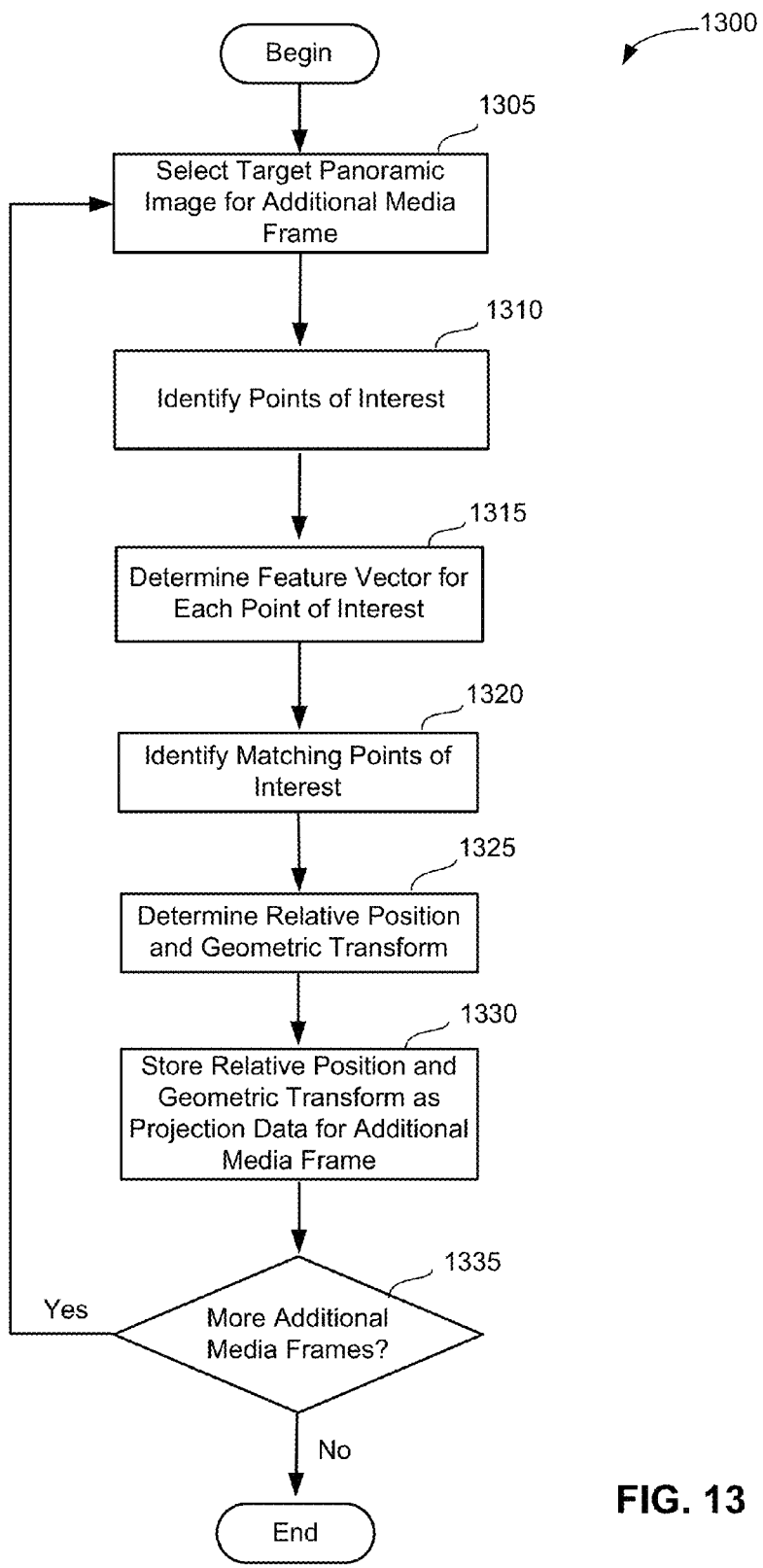
FIG. 13 is a flow diagram illustrating an exemplary method of determining association and projection data for an additional media object, in accordance with some embodiments of the present disclosure.

FIG. 13 is a flow diagram illustrating an exemplary method 1300 of determining association and projection data for an additional media object, in accordance with some embodiments of the present disclosure. The method may be implemented, for example, by one or more computers including one or more processors executing instructions encoded on one or more computer-readable storage media. The processing may occur on any combination of processors operatively connected to server 510 and/or client 550. Method 1300 begins at act 1305, at which a target panoramic image may be selected for a frame of the additional media object. The target panoramic image may be selected, for example, by comparing metadata of the additional media object frame with metadata of panoramic images in the panoramic image dataset. If the additional media object frame is geotagged with a particular geographic location, the target panoramic image may be selected as the panoramic image that is geotagged with the closest geographic location to that of the additional media object frame. Once the target panoramic image is selected, a link to that panoramic image may be stored in association with the additional media object frame in the associations dataset.

Method 1300 may then proceed to align the additional media object frame with the target panoramic image, for example using feature matching techniques as described in U.S. patent application Ser. No. 12/478569, filed Jun. 4, 2009, entitled "Geocoding by Image Matching". For example, at act 1310, a plurality of points of interest in the additional media object frame and in the target panoramic image may be identified. At act 1315, a feature vector may be computed for each point of interest. At act 1320, matching points of interest between the additional media object frame and the target panoramic image may be identified based on the feature vectors. Based on the matched points of interest, a relative position and a geometric transform may be determined for the additional media object frame with respect to the target panoramic image. Processing to determine a relative position and a geometric transform may involve, for example, evaluating multiple possible relative positions and/or geometric transforms using any of various evaluation techniques known in the art, such as computing an appropriate evaluation score for each possibility. At act 1330, the determined relative position and geometric transform may be stored as projection data for the additional media object frame in the associations dataset.

At act 1335, a determination may be made as to whether more additional media object frames remain for the additional media object. For example, if the additional media object is a video, it may contain multiple image frames for which association and projection data may be determined. If the determination at act 1335 is that more additional media object frames remain, method 1300 may loop back to act 1305, at which a target panoramic image for the next additional media object frame may be selected. If the determination is that no more additional media object frames remain, method 1300 ends.

Figure 14:
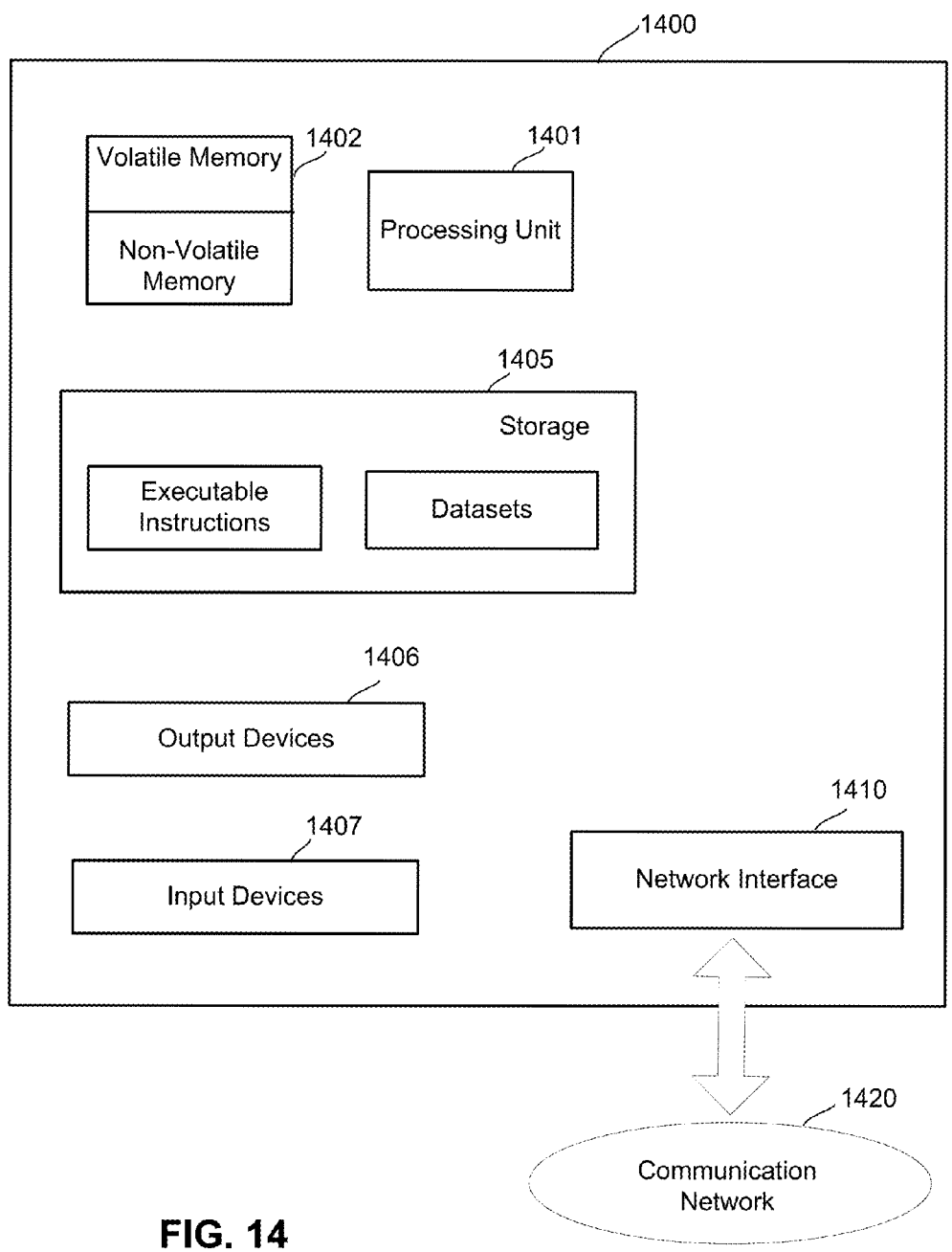
FIG. 14 is a block diagram illustrating an exemplary computing system for use in practicing some embodiments of the present disclosure.

Various inventive aspects described herein may be used with any of one or more computers and/or devices each having one or more processors that may be programmed to take any of the actions described above for allowing additional media objects to be viewed in the context of street-level panoramic images. For example, server 510 and/or client 550 may be implemented as one or more computers, as described above. FIG. 14 shows, schematically, an illustrative computer 1400 on which various inventive aspects of the present disclosure may be implemented. The computer 1400 includes a processor or processing unit 1401 and a memory 1402 that may include volatile and/or non-volatile memory. The computer 1400 may also include storage 1405 (e.g., one or more disk drives) in addition to the system memory 1402.

The memory 1402 and/or storage 1405 may store one or more computer-executable instructions to program the processing unit 1401 to perform any of the functions described herein. The storage 1405 may optionally also store one more datasets as needed. For example, a computer used to implement server 510 may store any combination of panoramic image dataset 520, additional media dataset 530 and/or associations dataset 540 in storage 1405. Alternatively, any of these datasets may be implemented separately from a computer used to implement server 510.

As mentioned above, the reference herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The computer 1400 may have one or more input devices and/or output devices, such as devices 1406 and 1407 illustrated in FIG. 14. These devices may be used, among other things, to present a user interface, such as user interface 555. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 14, the computer 1400 may also comprise one or more network interfaces (e.g., the network interface 1410) to enable communication via various networks (e.g., the network 1420). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. For instance, although examples have been provided of enhancing the user experience of browsing a location through embedding additional media objects in panoramic images, it should be appreciated that other types of reference images may also be embedded with additional media objects in accordance with the present disclosure. For example, other suitable types of reference images may include any of various types of images commonly used in mapping applications for browsing a location, such as aerial images, bird's-eye images, and photosynth images.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method for providing hybrid image data for display, the method comprising:
    receiving user input;
    determining a geographic location, a view direction, and at least one media image frame of at least one additional media object for display based at least on the user input, the at least one additional media object having a first depiction of at least a portion of a subject proximate the geographic location along the view direction;
    selecting a target panoramic image based at least on the geographic location, the target panoramic image having a second depiction of at least a portion of the subject;
    integrating, using at least one computer system, the at least one media image frame into the target panoramic image to produce a hybrid panoramic image having the first depiction of the subject generally aligned with the second depiction of the subject; and
    providing hybrid image data for display, the hybrid image data comprising at least a portion of the hybrid panoramic image in accordance with the view direction;
    wherein the user input comprises at least one indication selected from the group consisting of at least one indication of the geographic location, at least one indication of the view direction, and at least one indication of a first additional media object desired for display.

2. The computer-implemented method of claim 1, wherein the at least one additional media object comprises at least one photographic image.

3. The computer-implemented method of claim 1, wherein the at least one additional media object comprises a plurality of video image frames.

4. The computer-implemented method of claim 1, wherein the at least one additional media object is obtained from a media sharing website.

5. The computer-implemented method of claim 1, wherein the geographic location is determined based at least on metadata associated with the at least one media image frame.

6. The computer-implemented method of claim 1, further comprising providing at least one indication of at least one available additional media object based at least on the geographic location, wherein the at least one indication is selectable by a user to view the at least one available additional media object.

7. The computer-implemented method of claim 1, further comprising repeating the determining, selecting, integrating and providing for at least one next media image frame of the at least one additional media object in a time progression.

8. The computer-implemented method of claim 1, further comprising providing at least one indication of at least one overlapping media image frame not integrated into the hybrid image data, wherein a footprint of the at least one overlapping media image frame overlaps with a footprint of the at least one integrated media image frame, wherein the at least one indication is selectable by a user to view the at least one overlapping media image frame.

9. A system for providing hybrid image data for display, the system comprising at least one processor programmed to:
    receive first user input;
    determine a geographic location, a first view direction, and at least one media image frame of at least one additional media object for display based at least on the first user input, the at least one additional media object having a first depiction of at least a portion of a subject proximate the geographic location along the first view direction;
    select a target panoramic image based at least on the geographic location, the target panoramic image having a second depiction of at least a portion of the subject;
    produce hybrid image data comprising the at least one media image frame in an alignment with at least a first portion of the target panoramic image in accordance with the first view direction, the alignment at least approximately aligning the first depiction of the subject in the at least one media image frame with the second depiction of the subject in the target panoramic image; and
    provide the hybrid image data for display;
    wherein the first user input comprises at least one indication selected from the group consisting of at least one indication of the geographic location, at least one indication of the first view direction, and at least one indication of a first additional media object desired for display.

10. The system of claim 9, wherein the at least one processor is further programmed to:
    receive second user input indicating a second view direction; and
    provide updated hybrid image data for display, the updated hybrid image data comprising at least a portion of the at least one media image frame in the alignment with at least a second portion of the target panoramic image in accordance with the second view direction.

11. The system of claim 10, wherein the second user input comprises a selection of a second additional media object desired for display.

12. The system of claim 9, wherein the at least one processor is further programmed to:
    receive second user input indicating at least one parameter of additional media objects desired for display; and
    provide at least one indication of at least one available additional media object based at least on the at least one parameter, wherein the at least one indication is selectable by a user to view the at least one available additional media object.

13. The system of claim 12, wherein the at least one parameter is selected from the group consisting of at least one location at which at least one additional media object was captured, at least one author of at least one additional media object, at least one subject of at least one additional media object, and at least one time at which at least one additional media object was captured.

14. The system of claim 9, wherein the at least one processor is further programmed to provide at least one indication of at least one overlapping media image frame not included in the hybrid image data, wherein a footprint of the at least one overlapping media image frame overlaps with a footprint of the at least one media image frame included in the hybrid image data.

15. The system of claim 14, wherein the at least one processor is further configured to:
   receive second user input comprising a selection of at least one overlapping media image frame; and
   provide updated hybrid image data for display, the updated hybrid image data comprising the at least one overlapping image frame in an alignment with at least the first portion of the target panoramic image, the alignment aligning features of the at least one overlapping media image frame with features of the target panoramic image.

16. At least one non-transitory computer-readable storage medium encoded with a plurality of computer-executable instructions that, when executed, perform a method for providing hybrid image data for display, the method comprising:
   receiving user input;
   determining a geographic location, a view direction, and at least one media image frame of at least one additional media object for display based at least on the user input, the at least one additional media object having a first depiction of at least a portion of a subject proximate the geographic location along the view direction;
   selecting a target street-level panoramic image based at least on the geographic location, the target panoramic image having a second depiction of at least a portion of the subject;
   determining a projection to project the at least one media image frame onto the target street-level panoramic image, the projection mapping the first depiction of the subject in the at least one media image frame to the second depiction of the subject in the target street-level panoramic image;
   embedding the at least one media image frame in the target street-level panoramic image to produce a hybrid panoramic image, wherein the embedding comprises projecting the at least one media image frame onto the target street-level panoramic image and replacing at least a portion of the target street-level panoramic image with the projected at least one media image frame in accordance with the determined projection; and
   providing hybrid image data for display, the hybrid image data comprising at least a portion of the hybrid panoramic image in accordance with the view direction;
   wherein the user input comprises at least one indication selected from the group consisting of at least one indication of the geographic location, at least one indication of the view direction, and at least one indication of a first additional media object desired for display.

17. The at least one non-transitory computer-readable storage medium of claim 16, wherein the target street-level panoramic image represents a 360-degree range of view.

18. The at least one non-transitory computer-readable storage medium of claim 16, wherein the projection comprises a relative position and at least one geometric transform.

19. The at least one non-transitory computer-readable storage medium of claim 18, wherein the at least one geometric transform comprises a homography.

20. The at least one non-transitory computer-readable storage medium of claim 16, wherein the view direction is determined based at least on the projection.

* * * * *